United States Patent
Schauder et al.

(10) Patent No.: US 8,680,720 B2
(45) Date of Patent: Mar. 25, 2014

(54) AUTOMATIC AC BUS VOLTAGE REGULATION FOR POWER DISTRIBUTION GRIDS

(75) Inventors: Colin David Schauder, Murrysville, PA (US); Leo F. Casey, Lexington, MA (US)

(73) Assignee: Perfect Galaxy International Ltd., North Point (HK)

( * ) Notice: Subject to any disclaimer, the term of this patent is extended or adjusted under 35 U.S.C. 154(b) by 571 days.

(21) Appl. No.: 12/913,633

(22) Filed: Oct. 27, 2010

(65) Prior Publication Data

US 2012/0105023 A1    May 3, 2012

(51) Int. Cl.
*H01H 9/54* (2006.01)
(52) U.S. Cl.
USPC .......................................................... 307/140
(58) Field of Classification Search
USPC .......................................................... 307/140
See application file for complete search history.

(56) References Cited

U.S. PATENT DOCUMENTS

| | | | |
|---|---|---|---|
| 5,422,561 A | 6/1995 | Williams et al. | |
| 5,570,007 A | 10/1996 | Larsen | |
| 6,329,798 B1 | 12/2001 | Huggett et al. | |
| 7,116,010 B2 | 10/2006 | Lasseter et al. | |
| 7,265,521 B2 | 9/2007 | Kehrli et al. | |
| 8,030,791 B2 * | 10/2011 | Lang et al. | 290/44 |
| 2008/0278000 A1 | 11/2008 | Capp et al. | |

* cited by examiner

*Primary Examiner* — Robert L. Deberadinis
(74) *Attorney, Agent, or Firm* — Greenberg Traurig, LLP; David J. Dykeman; Roman Fayerberg

(57) ABSTRACT

A system for automatically regulating voltage on a distribution-level AC bus having an actual voltage and a nominal voltage includes an electronic power converter connected to the distribution-level AC bus. The system generates a feedback signal representative of the actual voltage of the distribution-level AC bus and produces an input control signal in response to the feedback signal. The input control signal is representative of a commanded level of reactive power. The electronic power converter is responsive to the input control signal to deliver a commanded reactive power output to the distribution-level AC bus, and the commanded reactive power output pushes the actual voltage towards the nominal voltage.

19 Claims, 4 Drawing Sheets

AUTOMATIC AC BUS VOLTAGE REGULATION FOR POWER DISTRIBUTION GRIDS

BACKGROUND OF THE INVENTION

This invention relates generally to regulating AC bus voltage in power distribution grids and more particularly to regulating AC bus voltage in power distribution grids having distributed power generation resources.

An increasing number of distributed power generation resources (such as solar panels, wind turbines, fuel cells, microturbines and the like) are being connected to low or medium voltage AC buses within the utility power distribution grid. Many distributed power generation resources are coupled to the grid through electronic power converters that have the inherent capability of rapidly synthesizing reactive power load (leading or lagging) for the grid, in addition to any real power being supplied from the power source.

The real power available from renewable power sources such as solar or wind tends to be variable, so that the KVA rating of distributed power converters is often only partially utilized in delivering real power to the grid. If the real power output of a distributed power converter is curtailed so that less than its rated KVA capability is used for real power transfer, the unused capability may be deployed for the useful generation of reactive power.

It is possible, but impractical, for a centralized grid control center to make decisions about the level of reactive power needed at a particular bus at any time in order to raise or lower the prevailing bus voltage. For example, an operator or a computer at the control center would notice high or low voltage at an inverter bus and dispatch a request for the inverter to change its reactive power output. This extremely slow time frame renders such reactive control methods impractical.

Another problem with renewable distributed power generation resources is that the fluctuations of the real power output from these sources cause variations in the distribution bus voltages (mainly due to the resistance of the distribution power circuits). This problem tends to limit the fraction (or "penetration") of renewable distributed power generation resources relative to conventional load that can be connected to a power distribution grid.

SUMMARY OF THE INVENTION

The present invention provides systems and methods for automatically regulating voltage on a distribution-level AC bus having an actual voltage and a nominal voltage. The system includes means for generating a feedback signal representative of the actual voltage of the distribution-level AC bus and means for generating an input control signal in response to the feedback signal. The input control signal is representative of a commanded level of reactive power. An electronic power converter is connected to the distribution-level AC bus. The electronic power converter is responsive to the input control signal to deliver a commanded reactive power output to the distribution-level AC bus, and the commanded reactive power output pushes the actual voltage towards the nominal voltage.

DETAILED DESCRIPTION OF THE INVENTION

The present invention relates to automatic voltage regulating systems and methods that use the available reactive power output from an electronic power converter of a distributed power generation resource to regulate the AC bus voltage at its point of connection to the grid. This generally relates to distributed power generation resources that are connected to a power distribution grid as opposed to a power transmission grid.

Figure 1:
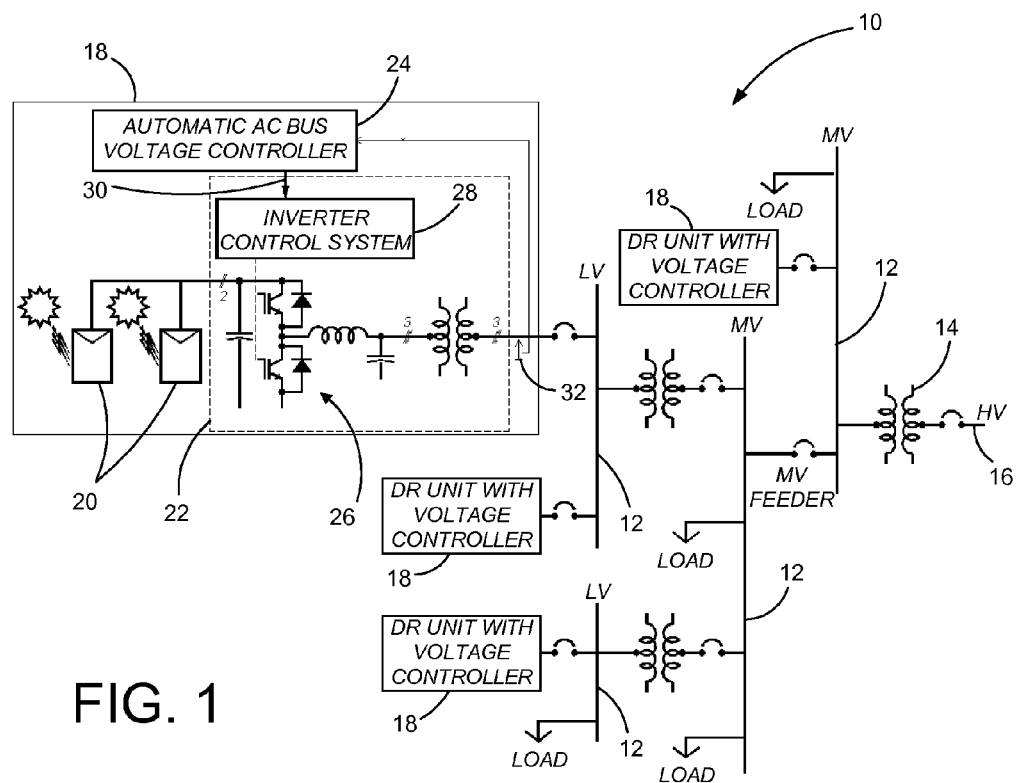
FIG. 1 is a one-line diagram of one embodiment of a power distribution grid having several distributed power generation resource units employing automatic voltage regulation connected thereto.

Referring to the drawings wherein identical reference numerals denote the same elements throughout the various views, FIG. 1 shows one example of a power distribution grid 10 comprising several distribution-level AC buses 12 supporting various loads. As used herein, the term "distribution-level AC buses" refers to buses, feeders and networks fed from transmission substations and includes both medium voltage AC buses (typically 1-38 kV AC) and low voltage AC buses (typically below 1000V AC). The power distribution grid 10 is supplied from a transmission sub-station 14, which is supplied by a high voltage transmission line 16 transmitting bulk power from a utility power generation source (not shown). Several distributed power generation resource units (DR units) 18 are connected to the distribution-level AC buses 12 via a set of output terminals. The DR units 18 employ automatic voltage regulation in accordance with the present invention and all cooperate to move the voltage at their respective connection points toward the intended or nominal value.

Each of the DR units 18 (one shown in detail in FIG. 1) generally comprises a distributed power generation resource 20, an electronic power converter 22, and an automatic AC bus voltage controller 24. The distributed power generation resource 20 in the illustrated embodiment is a photovoltaic array but the present invention is applicable to any type of distributed power generation resource, including but not limited to wind turbines, fuel cells, microturbines, etc. The distributed power generation resource 20 outputs a DC voltage that is supplied to the electronic power converter 22. The electronic power converter 22 comprises a grid-connect inverter 26 and an inverter control system 28 that is responsive to an input control signal 30 received from the automatic AC bus voltage controller 24. Under control of the control system 28, the inverter 26 converts the DC electrical power generated by the distributed power generation resource 20 to AC power and generally functions as a source of both real and reactive power to the associated distribution-level AC bus 12. That is, the electronic power converter 22 normally supplies real power to the distribution-level AC bus 12, but also can have excess capacity available for outputting reactive power to the distribution-level AC bus 12 without exceeding KVA limits.

One or more sensors 32 are provided for measuring the 3-phase AC bus voltage at the point the DR unit 18 is connected to the AC bus 12. Any suitable means for measuring voltage could be used; for instance, the sensors 32 could comprise resistive voltage dividers connected between the AC bus 12 and ground. The automatic AC bus voltage controller 24 receives the 3-phase AC bus voltage measurement and generates the input control signal 30, which is representative of a commanded level of reactive power. The input control signal 30 is fed to the inverter control system 28 of the electronic power converter 22. In response, the inverter control system 28 controls the amount of reactive power output by the inverter 26 to regulate the AC bus voltage at the point of connection of the DR unit 18.

Figure 2:
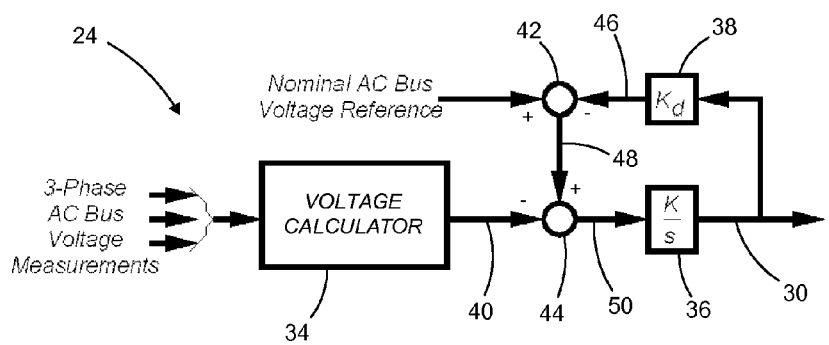
FIG. 2 is a block diagram showing one embodiment of an automatic AC bus voltage controller.

Turning to FIG. 2, one possible embodiment of the automatic AC bus voltage controller 24 includes a voltage calculator 34, a compensator 36 and a droop controller 38 forming a closed voltage control loop. The voltage calculator 34 receives the 3-phase AC bus voltage measurement and generates a voltage feedback signal 40 representative of the prevailing AC bus voltage at the connection point of the DR unit 18. The voltage feedback signal 40 can be generated in any suitable manner. In one possible implementation, the magnitude of the positive sequence fundamental voltage component is calculated by transforming the AC voltage vector to a synchronous reference frame, passing its components through a low-pass filter, and then calculating the resultant magnitude. There is a one-cycle latency in the voltage calculation if the fundamental positive sequence component is extracted in this way.

The automatic AC bus voltage controller 24 further includes first and second comparators 42 and 44. The first comparator 42 receives a reference signal corresponding to the nominal AC bus voltage for the associated DR unit 18 and a voltage droop signal 46 output by the droop controller 38. The first comparator 42 subtracts the voltage droop signal 46 from the nominal AC bus voltage reference. The output of the first comparator 42, referred to herein as the first output signal 48, is thus the difference between the nominal AC bus voltage and the voltage droop signal 46. The voltage feedback signal 40 and the first output signal 48 are fed to the second comparator 44, which subtracts the voltage feedback signal 40 from the first output signal 48. The output of the second comparator 44, referred to herein as the second output signal 50, is thus the difference between the first output signal 48 and the voltage feedback signal 40 and represents the error with respect to the nominal AC bus voltage.

The second output signal 50 is then applied to the compensator 36, which generates the input control signal 30 that is output to the inverter control system 28 of the electronic power converter 22. The compensator 36 performs at least the first order integral of the second output signal 50 (where the constant K represents a compensation gain factor) to ensure that the reactive output of the inverter 26 will be accurately related to the AC bus voltage deviation, and can include other various lead/lag terms.

The automatic AC bus voltage controller 24 includes a voltage control loop by which the input control signal 30 is fed to the droop controller 38. The droop controller 38 applies a droop factor, $K_d$, to the input control signal 30 to produce the voltage droop signal 46, which is fed to the first comparator 42. The droop factor $K_d$ determines the steady-state level of reactive power that will be output from the associated DR unit 18 for a given deviation in the local bus voltage. Specifically, the droop factor is the fractional deviation in local bus voltage that will be present when 1 p.u. reactive power is output from the unit in the steady state. (This assumes that 1 p.u. reactive power is achievable. If not, the output will be limited to the achievable level by the inverter control system 28.) It should be noted that the droop function shown in FIG. 2 can be achieved in several alternative ways that differ slightly in detail, but are essentially similar, and are encompassed by the present invention. For example, the voltage droop signal can be derived from measured reactive power (or the reactive current reference/command) instead of the reactive power command.

The automatic AC bus voltage controller 24 allows the dynamic performance to be adjusted so that the closed loop control bandwidth and the steady state voltage error can be set independently of each other. The droop factor $K_d$ determines the steady state error, and the compensation gain factor K essentially determines the closed loop bandwidth for a given power system impedance. The automatic AC bus voltage controller 24 produces a control scheme that operates in a fast time frame which is similar to that of the inverter control system 28, and may even be incorporated into the inverter control system 28. The automatic AC bus voltage controller 24 provides automatic (autonomous), local control of AC voltage that is much faster than conventional reactive control methods; response times on the order of one cycle (60 Hz) are achievable. The AC bus voltage controller 24 is able to perform voltage control so fast that the grid will not see even momentary voltage fluctuations when the real power output changes.

The input control signal 30 is representative of a commanded reactive power level having a steady-state value uniquely related to a difference between the actual voltage of the AC bus 12 and the nominal AC bus voltage. That is, the input control signal 30 essentially tells the inverter control system 28 what level of reactive power is needed to be output by the inverter 26 at any given time to push the AC bus voltage towards its nominal value. The input control signal 30 thus causes the inverter control system 28 to control the inverter 26 so as to regulate the AC bus voltage. In response to the input control signal 30, the inverter control system 28 causes the inverter 26 to deliver the proper amount of reactive power (i.e., a commanded reactive power output) to raise or lower the prevailing bus voltage, as needed. Because the transfer function relating incremental reactive power change to incremental voltage change varies widely as a function of the status of the distribution network, and because the accuracy of voltage measurement varies from one unit to another, the reactive power output from the inverter 26 is preferably not aimed at driving the locally-measured voltage to an absolute value using all available reactive power. Rather, the steady-state reactive power output from the inverter 26 should be of the correct polarity to move the voltage towards its nominal value, and its magnitude should be determined in proportion to the prevailing deviation of the voltage from the nominal value. In this way the DR unit 18 can use a scheduled portion of its available reactive power resources to help correct a voltage deviation, without trying to do the entire correction on its own.

With the control scheme of the present invention, the multiple, separate DR units 18 do not "fight" with each other for control of the voltage. For example, if two DR units 18 connected to the same bus 12 have slightly different voltage feedback signals 40 due to measurement inaccuracy, one being higher than nominal and one lower, the two DR units 18 do not use maximum reactive power output with opposing polarity to try to correct the perceived errors. Instead, the reactive power response from each DR unit 18 is measured, and in proportion to the perceived error, so that the two DR units 18 will output only a small reactive power (albeit of different polarity) in this example. This is a stable practical condition. Thus, all of the DR units 18 cooperate so as to share the reactive loading equitably as a function of the observed local voltage error, with errors in voltage measurement accounting for small, manageable deviations from the intended reactive power output of each DR unit 18. Because the DR units 18 (particularly the automatic AC bus voltage controllers 24) utilize automatic voltage regulation and operate independently of one another, this cooperation is achieved without the need for communication between the various DR units 18.

This control scheme also addresses the problem of fluctuations in the real power output from distributed power generation resources (which problem is particularly prevalent with renewable distributed power generation resources such as wind and solar). Such fluctuations cause variations in the distribution bus voltages, mainly due to the resistance of the distribution power circuits. As noted above, the automatic AC voltage regulation of the present invention can achieve very fast response times (one cycle or even faster). Because the reactance of the distribution power circuits greatly exceeds the resistance, the reactive power that is rapidly deployed by the inverter 26 will easily be able to compensate for any local voltage variations that would otherwise occur due to simultaneous fluctuations in the real power throughput. This provides a tremendous advantage that should remove a significant obstacle to the acceptance and high penetration of renewable distributed power generation resources.

Figure 3:
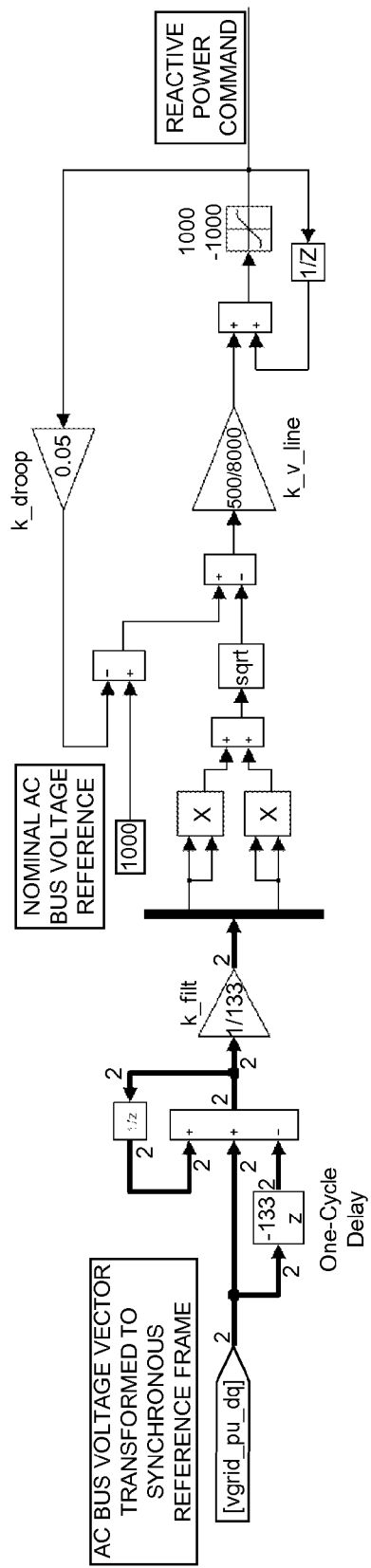
FIG. 3 is a block diagram depicting one detailed implementation of the automatic AC bus voltage controller.

FIG. 3 is a model block diagram showing one possible detailed implementation of the automatic AC bus voltage controller 24. This is a discrete-time implementation, using 8000 samples/second, and 1 p.u=1000.

Figure 4:
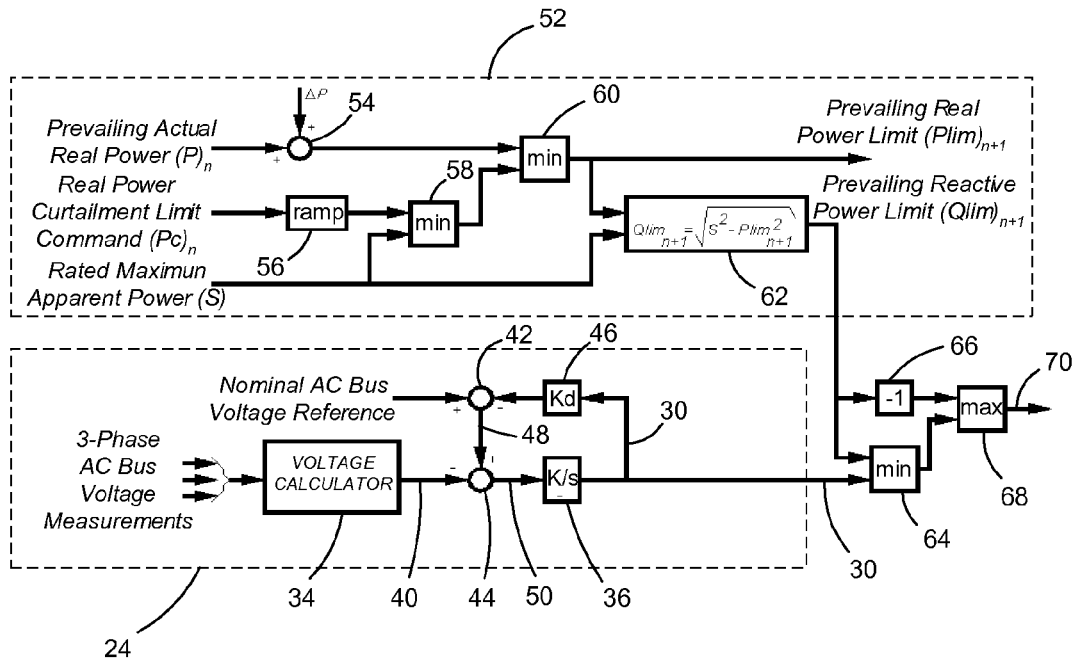
FIG. 4 is a block diagram showing an alternative embodiment of an automatic AC bus voltage controller combined with an apparent power management system.

FIG. 4 shows an alternative embodiment that combines the automatic AC bus voltage controller 24 described above with an apparent power management system 52. Taking into account that the inverter 26 typically has a strict limit on maximum apparent power output and is typically used primarily to deliver real power from a fluctuating distributed power generation resource 20 to the power distribution grid 10, the apparent power management system 52 manages the available apparent power of the electronic power converter 22 so that any apparent power that is not used for real power may be used to satisfy the reactive power commanded by the automatic AC bus voltage controller 24.

To this end, the apparent power management system 52 receives inputs of the prevailing actual real power, P, a real power curtailment limit command, $P_c$, and the rated maximum apparent power, S. The prevailing actual real power P is fed to a summer 54 where it is combined with a small power value, $\Delta P$, such that the summer 54 outputs a power signal that is maintained slightly higher than the prevailing actual real power P. The real power curtailment limit command $P_c$ is fed to a ramp unit 56 that provides an up-ramp for actual real power at a ramp-rate of $\Delta P/T$, where T is the discrete time sampling period. A first multiplexer 58 receives the ramped-up real power curtailment limit command $P_c$ and the rated maximum apparent power S and outputs the minimum one of the two signals. This outputted signal is then supplied to a second multiplexer 60, which also receives the power signal output by the summer 54. The second multiplexer 60 outputs the minimum one of the two signals, which functions as a prevailing real power limit, $P_{lim}$.

The apparent power management system 52 includes a power calculator 62 that receives the prevailing real power limit $P_{lim}$ and the rated maximum apparent power S and processes these signals to determine a prevailing reactive power limit, $Q_{lim}$. In one embodiment, the prevailing reactive power limit $Q_{lim}$ can be determined from the prevailing real power limit $P_{lim}$ and the rated maximum apparent power S using the algorithm:

$$Q_{lim_{n+1}} = \sqrt{S^2 - P^2_{lim_{n+1}}}.$$

The apparent power management system 52 works in concert with the automatic AC bus voltage controller 24. Specifically, the prevailing reactive power limit $Q_{lim}$ output by the apparent power management system 52 and the input control signal 30 output by the automatic AC bus voltage controller 24 are both supplied to a third multiplexer 64. The third multiplexer 64 outputs the minimum one of these two signals. The prevailing reactive power limit $Q_{lim}$ is also fed to an inverting amplifier 66, which in the illustrated embodiment has a gain of −1. The output of the third multiplexer 64 and the output of the inverting amplifier 66 are both inputted to a fourth multiplexer 68. The fourth multiplexer 68 outputs the maximum of these two inputs as a limited reactive power command 70. In this alternative embodiment, the limited reactive power command 70 is fed to the inverter control system 28 of the electronic power converter 22. In response, the inverter control system 28 causes the inverter 26 to output the appropriate level of reactive power needed to regulate the AC bus voltage.

Figure 5:
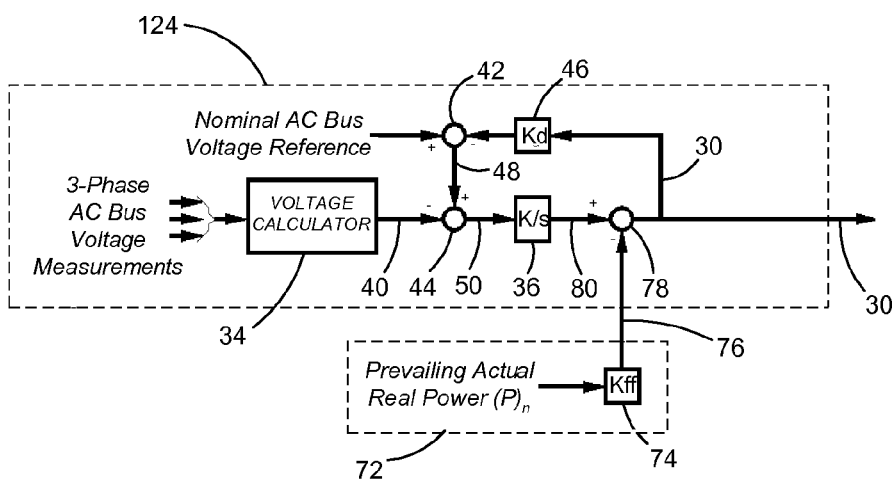
FIG. 5 is a block diagram showing another alternative embodiment of an automatic AC bus voltage controller combined with a real power feed-forward system.

FIG. 5 shows another alternative embodiment that combines an automatic AC bus voltage controller 124 (which is a modified version of the automatic AC bus voltage controller 24 described above) with a real power feed-forward system 72. The real power feed-forward system 72 operates to instantly lower the commanded level of reactive power (i.e., the input control signal 30) in proportion to the measured instantaneous real power output. This anticipates the action of the automatic voltage control scheme using the fact that the ac bus voltage will tend to move upwards when real power output increases. In essence, the real power feed-forward system 72 is simply an instantaneous power factor control scheme with a lagging (i.e., inductive as seen from the grid) power factor objective value (determined as (cos(arctan $(K_{ff})$)). The real power feed-forward helps to speed up the transient response of the automatic voltage control scheme, thereby improving its effectiveness in mitigating voltage disturbances due to real power fluctuations.

The real power feed-forward system 72 receives an input of the prevailing actual real power, P, a signal that represents the real power at either the AC or DC side of the electronic power converter 22. The prevailing actual real power signal is fed to a feed-forward controller 74. The feed-forward controller 74 applies a gain factor, $K_{ff}$, to the prevailing actual real power signal to produce a real power feed-forward signal 76. The gain factor $K_{ff}$ may be a constant chosen for a particular site location, or it may be adaptively changed from time to time based on changes in the grid impedance.

The modified automatic AC bus voltage controller 124 includes a voltage calculator 34, a compensator 36, a droop controller 38, a first comparator 42, and a second comparator 44, all arranged in the same manner as the corresponding elements of the above-described automatic AC bus voltage controller 24. The automatic AC bus voltage controller 124 further includes a third comparator 78. In this embodiment, the second output signal 50 generated by the second comparator 44 is applied to the compensator 36, and the compensator 36 generates a third output signal 80. The third comparator 78 receives the third output signal 80 and the real power feed-forward signal 76. The third comparator 78 subtracts the real power feed-forward signal 76 from the third output signal 80 to produce the input control signal 30 that is output to the inverter control system 28 of the electronic power converter 22 and fed to the droop controller 38.

Figure 6:
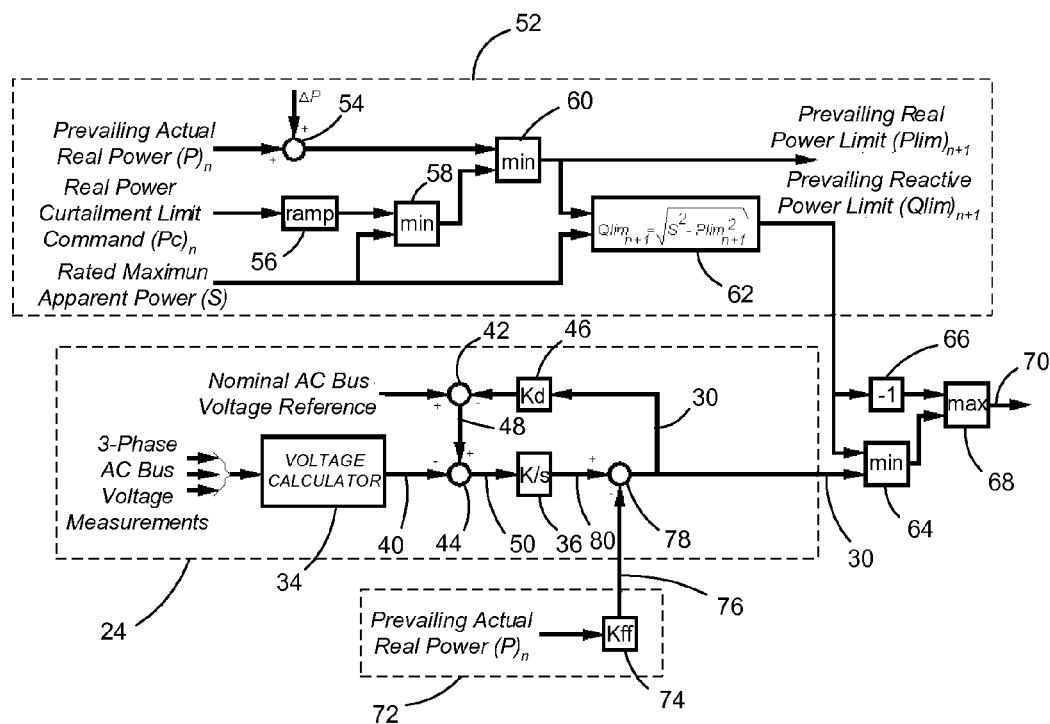
FIG. 6 is a block diagram showing yet another alternative embodiment of an automatic AC bus voltage controller combined with an apparent power management system and a real power feed-forward system.

FIG. 6 shows yet another alternative embodiment that combines the automatic AC bus voltage controller 124 with both the apparent power management system 52 and the real power feed-forward system 72. Each of these elements is described above in connection with FIG. 4 or 5, so a detailed description is not repeated here.

While specific embodiments of the present invention have been described, it should be noted that various modifications thereto can be made without departing from the spirit and scope of the invention as defined in the appended claims.

What is claimed is:

1. A system for automatically regulating voltage comprising:
   a distribution-level AC bus connected to a power distribution grid, the distribution-level AC bus having an actual voltage and a nominal voltage;
   a voltage calculator configured to receive a measurement of said actual voltage of said distribution-level AC bus and to generate a feedback signal representative of said actual voltage of said distribution-level AC bus;
   one or one comparators configured to receive the feedback signal, a droop signal and a reference signal representative of said nominal voltage and to generate a comparator output signal based on said feedback signal, said droop signal and said reference signal;
   a compensator configured to receive said compensator output signal and to generate an input control signal in response to said comparator output signal, said input control signal being representative of a commanded level of reactive power; and
   an electronic power converter connected to said distribution-level AC bus, wherein said electronic power converter is responsive to said input control signal to deliver a commanded reactive power output to said distribution level AC bus and said commanded reactive power output pushes said actual voltage towards said nominal voltage.

2. The system of claim 1 wherein said means for generating a feedback signal includes means for measuring the 3-phase AC bus voltage of said distribution-level AC bus.

3. The system of claim 1 wherein said means for generating an input control signal has a response time on the order of one cycle or faster.

4. The system of claim 1 wherein said electronic power converter comprises an inverter and a control system that controls said inverter in response to said input control signal.

5. The system of claim 1 wherein said commanded reactive power output is of the correct polarity to move said actual voltage towards said nominal voltage and its magnitude is in proportion to the deviation of said actual voltage from said nominal voltage.

6. The system of claim 1 further comprising means for managing the available apparent power of said electronic power converter so that any apparent power that is not used for real power may be used to satisfy said commanded reactive power output dictated by said input control signal.

7. The system of claim 1 further comprising means for instantly lowering said commanded reactive power output in proportion to a measured instantaneous real power output.

8. The system of claim 1 wherein the one or more comparators comprise
   a first comparator configured to receive the droop signal and the reference signal representative of said nominal voltage and to generate a first output signal based on said reference signal and said droop signal; and
   a second comparator configured to receive said feedback signal and said first output signal and to generate said comparator output signal based on said first output signal and said feedback signal.

9. An automatic voltage regulating system comprising:
   an electronic power converter connecting a distributed power generation resource to a distribution-level AC bus;
   one or more sensors configured to measure a 3-phase AC bus voltage at said electronic power converter's connection point to said distribution-level AC bus; and
   an automatic AC bus voltage controller comprising
      a voltage calculator that receives input of the 3-phase AC bus voltage measurement from said one or more sensors and generates a feedback signal representative of said actual voltage of said distribution-level AC bus,
      one or one comparators that receive the feedback signal, a droop signal and a reference signal representative of a nominal voltage of said distribution-level AC bus and generate a comparator output signal based on said feedback signal, said droop signal and said reference signal, and
      a compensator that receives said comparator output signal and, in response, generates an input control signal representative of a commanded level of reactive power, wherein said electronic power converter is responsive to said input control signal to deliver a commanded reactive power output to said distribution-level AC bus and that moves the AC bus voltage towards its nominal value.

10. The automatic voltage regulating system of claim 9 wherein said automatic AC bus voltage controller has a response time on the order of one cycle or faster.

11. The automatic voltage regulating system of claim 9 further comprising:
    an additional electronic power converter connecting a distributed power generation resource to a distribution-level AC bus;
    an additional means for measuring the 3-phase AC bus voltage at said additional electronic power converter's connection point to the corresponding distribution-level AC bus; and
    an additional automatic AC bus voltage controller that receives input of a 3-phase AC bus voltage measurement from said additional means for measuring and generates an additional input control signal representative of a commanded level of reactive power, wherein said additional electronic power converter is responsive to said additional input control signal to deliver a commanded reactive power output to the corresponding distribution-level AC bus and that moves the AC bus voltage towards its nominal value.

12. The automatic voltage regulating system of claim 11 wherein said automatic AC bus voltage controllers operate independently of one another and cooperate to share reactive loading.

13. The automatic voltage regulating system of claim 9 wherein said electronic power converter comprises an inverter and a control system that controls said inverter in response to said input control signal.

14. The automatic voltage regulating system of claim 9 wherein said commanded reactive power output is of the correct polarity to move said actual voltage towards said nominal voltage and its magnitude is in proportion to the deviation of said actual voltage from said nominal voltage.

15. The automatic voltage regulating system of claim 9 further comprising means for managing the available apparent power of said electronic power converter so that any apparent power that is not used for real power may be used to satisfy said commanded reactive power output dictated by said input control signal.

16. The automatic voltage regulating system of claim 9 further comprising means for instantly lowering said input control signal in proportion to a measured instantaneous real power output.

17. The system of claim 9 wherein the one or more comparators comprise
   a first comparator configured to receive the droop signal and the reference signal representative of said nominal voltage and to generate a first output signal based on said reference signal and said droop signal; and
   a second comparator configured to receive said feedback signal and said first output signal and to generate said comparator output signal based on said first output signal and said feedback signal.

18. A method for automatically regulating voltage on a distribution-level AC bus that is connected to a distributed power generation resource, said method comprising:
   measuring the actual voltage of said distribution-level AC bus generating a feedback signal representative of said actual voltage;
   calculating an output signal based on said feedback signal, a droop signal and a reference signal representative of said nominal voltage;
   generating an input control signal in response to said output signal, said input control signal being representative of a commanded level of reactive power; and
   delivering, in response to said input control signal, a commanded reactive power output to said distribution-level AC bus, wherein said commanded reactive power output regulates said actual voltage by pushing it towards a nominal value.

19. The method of claim 18 wherein said voltage regulation occurs with a response time on the order of one cycle or faster.

* * * * *